United States Patent [19]

Böddeker

[11] Patent Number: 4,806,245
[45] Date of Patent: Feb. 21, 1989

[54] PERVAPORATION OF PHENOLS

[75] Inventor: Karl W. Böddeker, Breitenfelde, Fed. Rep. of Germany

[73] Assignee: Bend Research, Inc., Bend, Oreg.

[21] Appl. No.: 175,683

[22] Filed: Mar. 21, 1988

Related U.S. Application Data

[63] Continuation of Ser. No. 918,533, Oct. 14, 1986.

[51] Int. Cl.[4] ............................................. B01D 13/00
[52] U.S. Cl. ................................. 210/640; 210/195.2
[58] Field of Search ............... 210/640, 650, 651, 653, 210/195.2

[56] References Cited

U.S. PATENT DOCUMENTS

| | | | |
|---|---|---|---|
| 2,159,434 | 5/1939 | Frey | 210/640 |
| 3,228,876 | 1/1966 | Mahon | 210/655 X |
| 4,082,658 | 4/1978 | Fritzsche et al. | 210/640 X |

Primary Examiner—Frank Spear
Attorney, Agent, or Firm—Chernoff, Vilhauer, McClung & Stenzel

[57] ABSTRACT

Aqueous phenolic solutions are separated by pervaporation to yield a phenol-depleted retentate and a phenol-enriched permeate. The separation effect is enhanced by phase segregation into two immiscible phases, "phenol in water" (approximately 10% phenol), and "water in phenol" (approximately 70% phenol). Membranes capable of enriching phenols by pervaporation include elastomeric polymers and anion exchange membranes, membrane selection and process design being guided by pervaporation performance and chemical stability towards phenolic solutions. Single- and multiple-stage processes are disclosed, both for the enrichment of phenols and for purification of water from phenolic contamination.

14 Claims, 8 Drawing Sheets

PERVAPORATION OF PHENOLS

The government has rights in this invention under Contract No. DE-AC03-83-ER80034 awarded by the Department of Energy.

This application is a continuation of application Ser. No. 918,533, filed Oct. 14, 1986, now abandoned.

BACKGROUND OF THE INVENTION

Phenol-contaminated water as a by-product of various chemical processes is a recognized industrial problem, both in terms of water toxicity and recovery of phenols. As to toxicity, it is known that phenols are toxic to fish at concentrations as low as 0.1 ppm, while at 0.01 ppm, an extremely disagreeable taste is imparted to water treated by hypochlorite to render it potable, owing to the formation of chlorophenols. Residual phenol concentrations from such sources as gasworks, coking plants, refineries, coal processing plants, tar processing plants, pesticide plants, phenol conversion plants, and phenoplast plastics materials plants vary from a few ppm to as high as 10%.

Known processes for the purification of phenolated water are few, and may be broadly characterized as falling into one of two categories: (1) recovery processes; or (2) chemical/biological destruction processes. In the first category, there are included processes such as liquid-liquid solvent extraction (see, for example, U.S. Pat. No. 3,673,070), steam distillation, absorption on activated charcoal or ion-exchange resins, and foaming with surfactants. In the second category are included processes such as treatment by activated sludges and bacterial beds, oxidation by ozone, permanganate, chlorine, catalayzed hydrogen peroxide, and electrolysis (see U.S. Pat. No. 3,730,864). Another process not falling into either category is that disclosed in U.S. Pat. No. 3,931,000, comprising passing an aqueous polysubstituted phenolic feed stream around the outside of a bundle of hollow fibers while passing sodium hydroxide solution into the hollow fibers, the phenols passing through the fibers to form insoluble sodium phenate salts which concentrate inside the hollow fiber membrane, and are swept out of the system with the sodium hydroxide solution stream.

However, none of the above processes have been totally effective, leaving a significant residual phenol content, and will suffer from various serious drawbacks, such as strict monitoring of the content and pH of the feed stream in the case of bacterial bed treatment, regeneration of absorbents, high cost of reactants in the case of oxidation treatment, and production of undesirable by-products (chlorophenols) in the case of chlorination treatment.

Use of membranes for pervaporation has been limited. The only known commercially useful pervaporation membrane is one for dehydrating ethanol and propanol which comprises a composite of polyvinyl alcohol on a porous support of polyacrylonitrile. See 53 *Desalination* 327 (1985). Ion-exchange membranes have been investigated as to pervaporation effects on aqueous ethanol and lower carboxylic acid mixtures, with the water having pervaporated preferentially. Böddeker, *Proc. 1st. Int. Symp. Pervaporation* (Feb. 1986). And silicone rubber membranes have been used for the selective pervaporation of halogenated hydrocarbons and butanol from aqueous solutions thereof. See 8 *J. Membr. Sci.* 177 (1983). However, none of these membranes have been incorporated into a pervaporation process that is technically feasible.

It is therefore a principal objective of the present invention to provide a simple, highly efficient, and inexpensive method of purifying phenol-contaminated water.

It is an equally important objective of the present invention to provide a simple, highly efficient and inexpensive method of recovering phenols from aqueous phenolic solutions.

These and other objects that will become apparent are achieved by the method of the present invention, which is summarized and described in detail below.

SUMMARY OF THE INVENTION

The present invention is based on the discovery that certain classes of nonporous polymeric membranes, when used in a pervaporation mode, will selectively transport and thereby enrich the phenols content in the permeate of the process. This selective permeation of phenols is unexpected in view of the much lower volatility of phenols relative to that of water, based upon which one would predict precisely the opposite order of transport. An integral part of the invention lies in the related discovery that the phenolic enrichment factor strongly increases with decreasing phenolic concentration of the feed stream, thus permitting a process by which, through a limited number of consecutive pervaporation steps, the phenolic content of the permeate can be raised to a concentration at which natural phase separation spontaneously occurs. Still another unique aspect of the present invention is the discovery that, with increasing feed concentration, the phenolic enrichment factor remains relatively constant and, in some cases, actually increases.

The present invention accordingly comprises a single- or multiple-step method for both ridding water of phenolic contaminants and recovering phenols of relatively high concentration. The method includes two distinct steps: (1) a pervaporation step; followed by (2) a phase separation step.

The pervaporation step essentially comprises contacting the feed side of a nonporous polymeric membrane having certain characteristics detailed below with an aqueous phenol-containing feed stream while maintaining on the permeate side of the membrane either a sweep stream or a coarse vacuum, whereupon phenols in the feed stream preferentially diffuse through the membrane to form a phenol-rich permeate comprising phenols and water in a vapor state and leaving a phenol-depleted water retentate on the feed side of the membrane.

The phase separation step essentially comprises condensing the pervaporated phenol-rich permeate of a certain concentration, that concentration exceeding the concentration at which spontaneous phase separation occurs into an upper phenol-poor fraction and a lower phenol-rich fraction.

A large number of variations of the pervaporation step and the phase separation step and combinations of the two steps are feasible by combinihg and recycling permeates, retentates and separated fractions as feeds and by consecutive pervaporation steps, thus permitting custom-made applications of the method to achieve a desired degree of purification of water or concentration of phenols. And, as one skilled in the art will readily appreciate, the present invention may be utilized in connection with other known phenol separation methods.

DETAILED DESCRIPTION OF THE INVENTION

Figure 1:
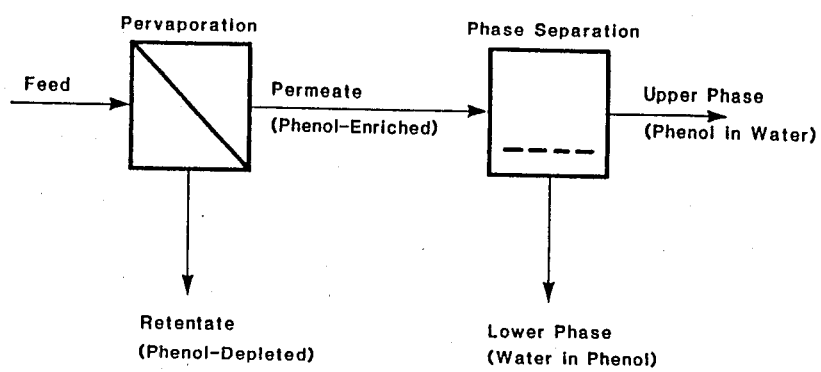
FIGS. 1-5 comprise schematic flow diagrams of exemplary applications of the present invention.

According to the present invention, there is provided a simple, efficient and inexpensive method for the recovery of both phenols and phenol-purified water from phenol-contaminated water, the method comprising a single- or multiple-step pervaporation separation or a combination of pervaporation separation and phase separation steps.

The pervaporation step comprises contacting the feed side of a nonporous polymeric membrane having a feed side and a permeate side with an aqueous phenol-containing feed stream, said membrane not being degraded by phenols and selected from the group consisting essentially of elastomeric polymers and anion exchange polymers, and maintaining on the permeate side of said membrane either an inert gas sweep stream or a pressure of 10 mmHg or less, whereby phenols in said feed stream selectively diffuse through said membrane to form a phenol-rich permeate comprising phenol and water in a vapor state on the permeate side of said membrane, and leaving a phenol-depleted water retentate on the feed side of said membrane, followed by recovery of the phenol-depleted water retentate.

The phase separation step may be utilized when the phenolic concentration in the permeate has exceeded a threshold concentration (about 10% by weight, depending upon the temperature of the condensate) at which spontaneous phase separation of the condensed permeate occurs into a phenol-poor fraction (also about 10% by weight phenol) and a phenol-rich fraction (about 70% by weight phenol). The "phenol-poor" fraction is often also referred to as "phenol in water," while the "phenol-rich" fraction is also referred to as "water in phenol."

The terms "phenol," "phenols," and "phenolic" are intended to include phenol, pyrocatechol, resorcinol, hydroquinone, naphthols, as well as substituted phenols such as phlorol, cresols, and xylenols.

By "nonporous" membranes is meant membranes capable of separations that are best described by the solution-diffusion model, the class of membranes generally comprehending those with no discernable pores having a diameter greater than 5 Angstroms. Membranes usable in the present invention may not be susceptible to degradation by phenols in any concentration for obvious reasons. Classes of elastomeric polymers include silicone rubbers, polyesters, polyurethanes, and soft segment copolymers containing flexible groupings such as chains of rigid polyamide with flexible polyether segments. Preferred examples of such elastomeric polymers are a silicone-polycarbonate copolymer made by General Electric Co. of Schenectedy, N.Y. and sold under the trade name "MEM-213," a polyether-polyamide block copolymer made by Atochem S.A. of Paris, France, and sold under the trade name "Pebax 5533," a polyester base polyurethane made by Lord Corporation of Erie, Penn., and sold under the trade name "Tuftane TF-312," a polyether base polyurethane also made by Lord Corporation and sold under the trade name "Tuftane TF-410," and a diol terephthalate-polyether diol terephthalate block copolymer made by DuPont Company of Wilmington, Del. and sold under the trade name "Hytrel 5556."

Anion exchange polymers include virtually any polymer containing in some fashion the well-known anion exchange functionality of a quaternized ammonium group, as well as weak base anion exchange of the tertiary amine types. Preferred examples are a series of polymer films containing quaternized vinylbenzylamine groups grafted onto polyethylene or polytetrafluoroethylene made by RAI Research Corporation and sold under the trade name "Raipore," including "Raipore R-1035," "Raipore R-4035," "Raipore R-5035L," and "Raipore R-5035H."

Membranes useful in the present invention may be either flat or tubular, such as tubular membranes and hollow fibers, including asymmetric membranes. In the case of flat sheets, the dry thickness of the membranes may vary from 2 to 200 micrometers, 5-50 micrometers being preferred, the essential criterion being that the membrane withstand the low pressure applied to it on the permeate side of the membrane. Incorporation into pervaporation modules or series of modules comprises a convenient way of using membranes in the method of the present invention. In the case of hollow fibers, incorporation into modules by potted bundles is the preferred form of use, in the same fashion as such fibers are used in the reverse osmosis art. Hollow fibers are best used with a lumen-side feed.

The process of the present invention may be used on aqueous solutions of phenols having virtually any phenolic concentration from a few ppm up to about 10% by weight* (all concentrations hereafter, when specified as a percentage, refer to percent by weight). Under pervaporation conditions, the membrane is in a state of extreme anisotropic swelling, ranging from fully swollen near the feed side to near dryness at the permeate side, resulting in an extremely steep concentration profile within the membrane from very high at the feed side to very low at the permeate side.

*The concentration above which, at 40° C. or below spontaneous phase separation occurs.

Subject to the stability of the membranes, the aqueous phenolic feed solution may be at temperatures ranging anywhere from about 20° C. up to the boiling point of water, slightly elevated temperatures of 45° to 90° C. being preferred. The process of the present invention is therefore highly efficient, allowing the use of low-grade, waste-type heat (temperatures of less than 100° C.) to be utilized to produce a relatively high grade product. The linear crossflow velocity of the feed may range from 10 to 100 cm/sec. When a sweep stream is used on the permeate side of the membrane, the gas should be both inert to phenols and water and noncondensable. Examples include air, nitrogen, argon and helium. When a vacuum is maintained on the permeate side, it should be less than 10 mmHg. It should be noted that, in the process of the present invention, the downstream or permeate side pressure is entirely independent of the feed side pressure.

Condensation of the vaporized permeate emerging from the permeate side of the membrane may be accomplished by any number of known methods, including collection on a cold surface such as in a cold trap, or subjecting the same to elevated pressure.

Referring now to the drawings, FIG. 1 comprises a schematic diagram illustrating both the pervaporation step and the phase separation step of the present invention, having the objectives of (a) removal of phenols from waste water or process water to produce water meeting safe disposal or reuse purity requirements; and (b) enrichment and recovery of phenol to a "water in phenol" solution comprising roughly 70% phenol and 30% water. As shown therein, the aqueous phenolic feed solution is directed to the feed side of a nonporous polymeric membrane of the type described herein, represented by the diagonal line in the "Pervaporation" box. An inert gas sweep stream of coarse vacuum of 10 mmHg or less is maintained on the downstream or permeate side of the membrane, causing permeation or diffusion of the liquid phase feed stream from the feed side of the membrane to the permeate side of the membrane, the phenols in the feed being transported in preference to water, so as to form a phenol-enriched vaporized permeate on the permeate side of the membrane, and leaving on the feed side of the membrane a phenol-depleted liquid retentate, or phenol-purified water, the degree of purification depending upon the particular separation characteristics of the membrane used, the membrane surface area, and the duration of contact of the feed with the membrane. The vaporized permeate is continually condensed in, for example, a cold trap (not shown) into a phenol-enriched aqueous liquid. When the concentration of phenols in the permeate is about 10%, upon condensation of the permeate, separation into two immiscible phases spontaneously occurs, shown schematically by the dashed horizontal line in the "Phase Separation" box of FIG. 1, into an upper phenol-poor or "phenol in water" phase comprising about 10% phenol and 90% water, and a lower phenol-rich or "water in phenol" phase comprising about 70% phenol and 30% water. The lower phase may be withdrawn from the process, representing recovery of a highly concentrated aqueous phenolic solution.

Figure 2:
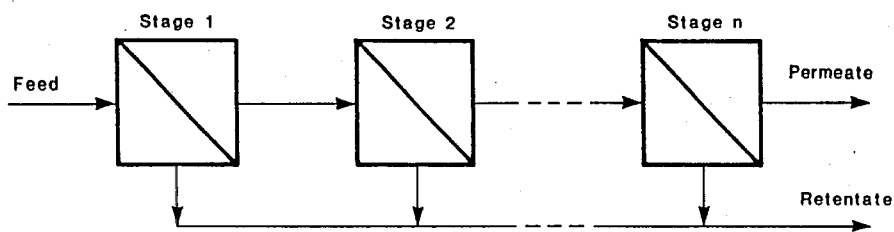

FIG. 2 schematically illustrates a multi-stage arrangement of pervaporation modules, allowing repeated processing of the permeate resulting from each pervaporation step wherein the condensed permeate of a given stage constitutes the feed of the next stage. As shown in FIG. 2, the resulting retentate of each stage may be combined to produce a single retentate exiting the process stream and recoverable as phenol-depleted water, while a single phenol-enriched permeate, that of the last stage, is produced.

Figure 3:
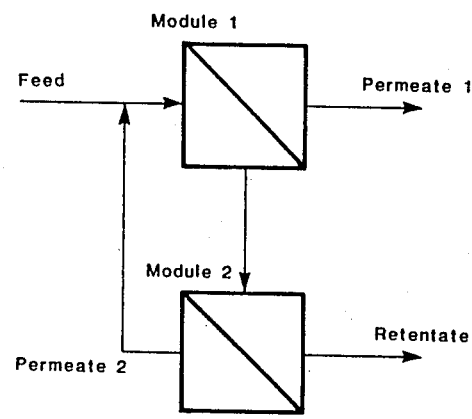

FIG. 3 shows a serial arrangement of pervaporation modules, which, for the sake of simplicity in illustration, represents two pervaporation steps, wherein the retentate of a first pervaporation step serves as the feed of a second pervaporation step and the downstream second permeate is recycled as part of the feed to the first pervaporation step. As may be readily seen, such a serial arrangement need not be limited to two pervaporation modules.

Figure 4:
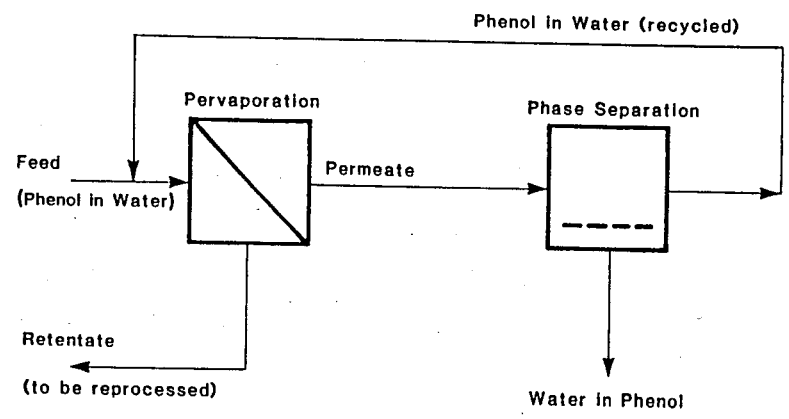

FIG. 4 illustrates another important advantage of the method of the present invention, combining pervaporation and phase separation, wherein the phenol-poor (or "phenol in water") fraction from a first phase separation step comprises the feed to a second sequel of pervaporation and phase separation steps. In this scheme, the "phenol in water" fraction resulting from a combination of pervaporation and phase separation steps such as shown in FIG. 1 comprises the "phenol in water" feed having a phenolic concentration of about 10%, this "phenol in water" feed being pervaporated to yield a phenol-enriched permeate which, upon condensation and upon reaching a phenol concentration of about 10%, undergoes spontaneous phase separation into an upper phenol-poor (or "phenol in water") fraction comprising about a 10% aqueous phenolic solution, and a lower phenol-rich (or "water in phenol") fraction. The "phenol in water" fraction, being identical in composition to the feed of the pervaporation step shown at the left hand side of FIG. 4, may be recycled to that same feed.

Figure 5:
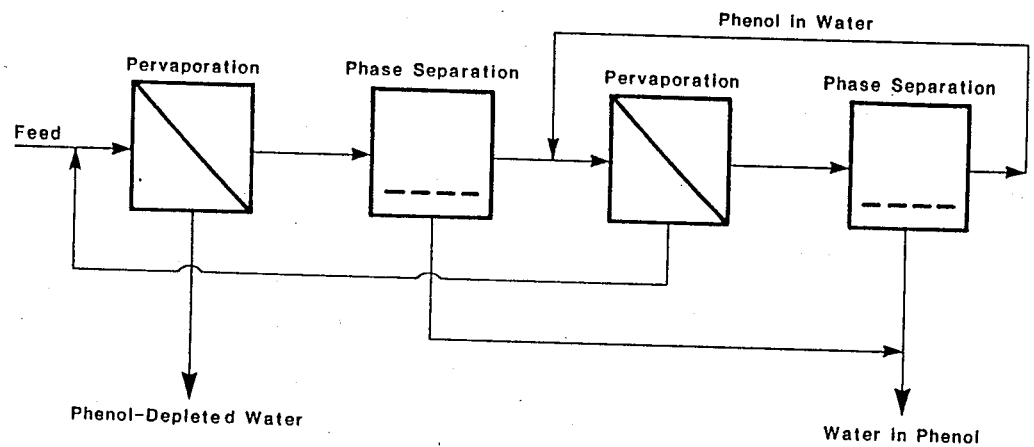

Simultaneously with the production of the phenol-enriched permeate, the pervaporation step shown in FIG. 4 leaves a phenol-depleted retentate which, due to its relatively low phenol concentration, is suited to be recycled as feed to the initial pervaporation stage, as shown in FIG. 5, FIG. 5 essentially comprising the combination of the scheme shown in FIG. 1 with that shown in FIG. 4.

As mentioned above, the process of the present invention, by virtue of the large number of permutations of steps available, may be used to tailor a predetermined degree of either phenol-purified water or phenolic values. Of course, the selectivity and flux density of the membrane chosen also constitute factors influencing the degree of separation achieved.

As is the case with membrane separations in general, selectivity and flux in the membrane pervaporation separation of the present invention have opposite tendencies, the greatest phenolic enrichment being generally observed at the lowest flux density. For convenience herein, the selectivity of a given membrane is expressed as an "enrichment factor," that factor comprising the ratio of phenolic concentration in the permeate to phenolic concentration in the feed.

The elastomeric polymeric membranes useful in the present invention generally exhibit a moderately increasing enrichment at high phenol concentration, followed by a significant increase in enrichment with a low residual phenol concentration, while flux density remains nearly independent of phenol concentration, declining slightly as phenolic depletion progresses.

The anion exchange membranes useful in the present invention behave differently than the elastomeric membranes in that enrichment is generally lower and flux density generally higher than with the elastomeric membranes. Both phenol enrichment and flux density increase at low phenolic concentrations in the feed. But, when viewed as a function of the total concentration range entailed, the enrichment factor passes through a minimum, whereas the flux density steadily increases with phenol depletion of the feed.

In general, an increase of the temperature at which pervaporation is conducted has the effect of lowering the enrichment factor and increasing flux density. Flux density is inversely proportional to membrane thickness, while thickness appears to have no impact on enrichment capability. Suitable phenol depletion in a single stage pervaporation step may be accomplished by highly selective membranes, whereas a multi-stage pervaporation process is required to achieve the same degree of phenol depletion with a less selective, more permeable membrane. In a multi-stage pervaporation process, each pervaporation stage is designed to produce a retentate of a targeted residual phenol concentration high yield of phenol-depleted retentate.

EXAMPLE 1

Aqueous phenolic feed solutions comprising 200 ppm of each of phenol (b.p. 181° C.), phlorol (b.p. 196° C.) and xylenol (b.p. 212° C.), for a combined total phenolic concentration of 600 ppm was fed at 1.2 L/min and 50° C. for about 2 hours via a rotary feed pump with a flowmeter through two pervaporation cells in parallel, the functional part of each cell comprising the nonporous polymeric membranes noted in Table 1, each membrane having a surface area of 45.5 cm$^2$, and a dry thickness varying from 1 to 2 mils. The downstream or permeate side of each cell was connected via cold traps to a vacuum pump which maintained a pressure of 5-10 mmHg on that side of the cell, the cold traps being immersed in liquid nitrogen to effect condensation of the permeate. Downstream pressure was monitored by a mercury manometer in close proximity to the downstream side of the pervaporation cell. Analysis for phenolic enrichment was by both high pressure liquid chromatography and by ultraviolet spectroscopy. The results are shown in Table 1, the enrichment factors being expressed as noted above, and flux density being expressed in kg/m$^2$·day.

TABLE 1

| Membrane | Enrichment Factor | Flux Density |
|---|---|---|
| Hytrel 5556 | 24 | 4.9 |
| MEM-213 | 60 | 5.5 |
| Pebax 5533 | 150 | 5.2 |
| Tuftane TF 312 | 14 | 2.8 |
| Tuftane TF 410 | 30 | 3.8 |
| Raipore R-1035 | 3 | 68 |
| Raipore R-4035 | 6 | 18 |
| Raipore R-5035L | 3 | 32 |
| Raipore R-5035H | 5 | 13 |

EXAMPLE 2

Three of the membranes of Example 1 were evaluated assuming two pervaporation cells in series, as schematically shown in FIG. 3, and further assuming the continuation of pervaporation in discrete steps of increasing phenolic concentration of the feed just until spontaneous phase separation of the condensed permeate took place, the separation being one of an upper phenol-poor phase ("phenol in water") comprising about 10% phenol in water and a lower phenol-rich phase ("water in phenol") comprising about 70% phenol in water. The results are shown in Table 2, with feed concentration being given in ppm phenols.

TABLE 2

| Membrane | Feed Concentration Yielding Phase Sep'n | Enrichment Factor at Phase Sep'n |
|---|---|---|
| Pebax 5533 | 1,700 | 57 |
| MEM-213 | 3,200 | 31 |
| Raipore R-4035 | 11,500 | 8.5 |

EXAMPLE 3

The same three membranes of Example 2 were used in a single pervaporation stage to determine the relationship between the concentration of phenolics in the feed and enrichment and flux density. The values obtained were plotted in the graphs comprising FIGS. 6–8.

Figure 6:
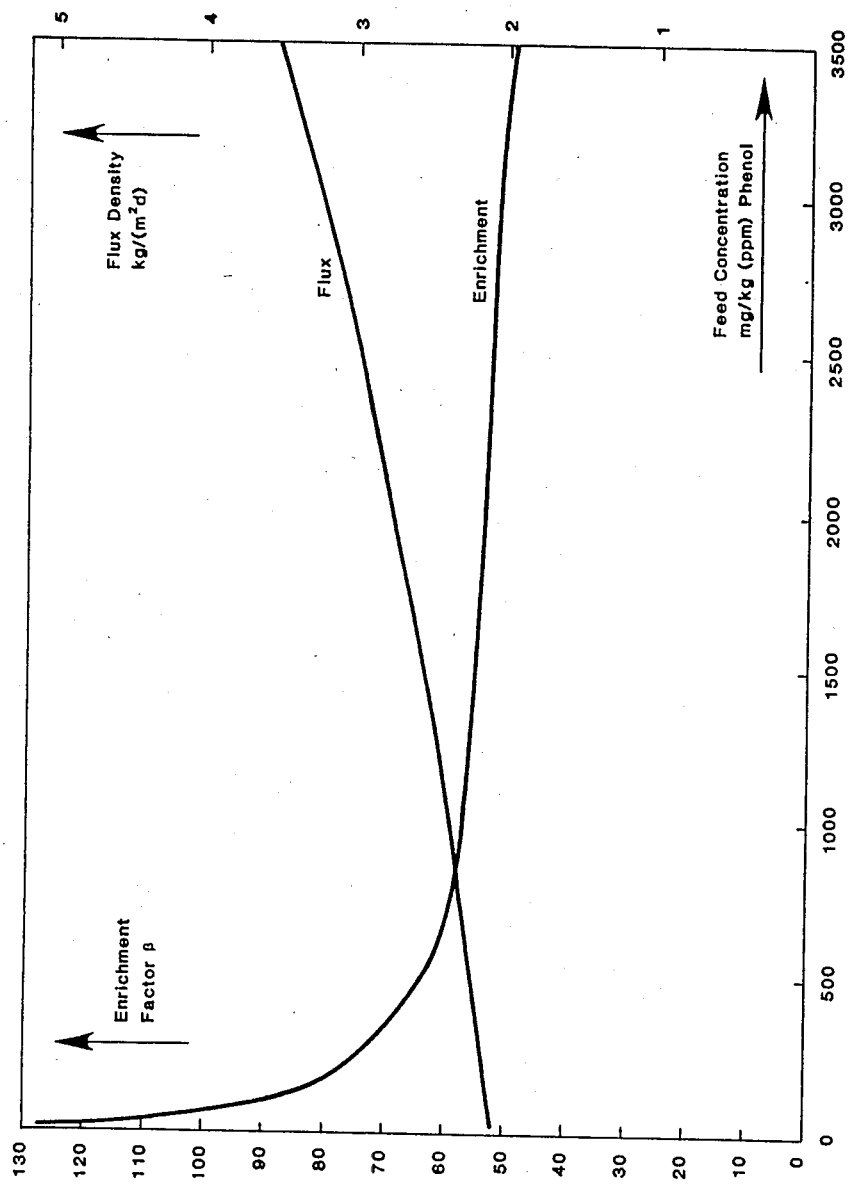
FIGS. 6-8 comprise graphs showing the pervaporation performance of three exemplary membranes of the present invention.
Figure 7:
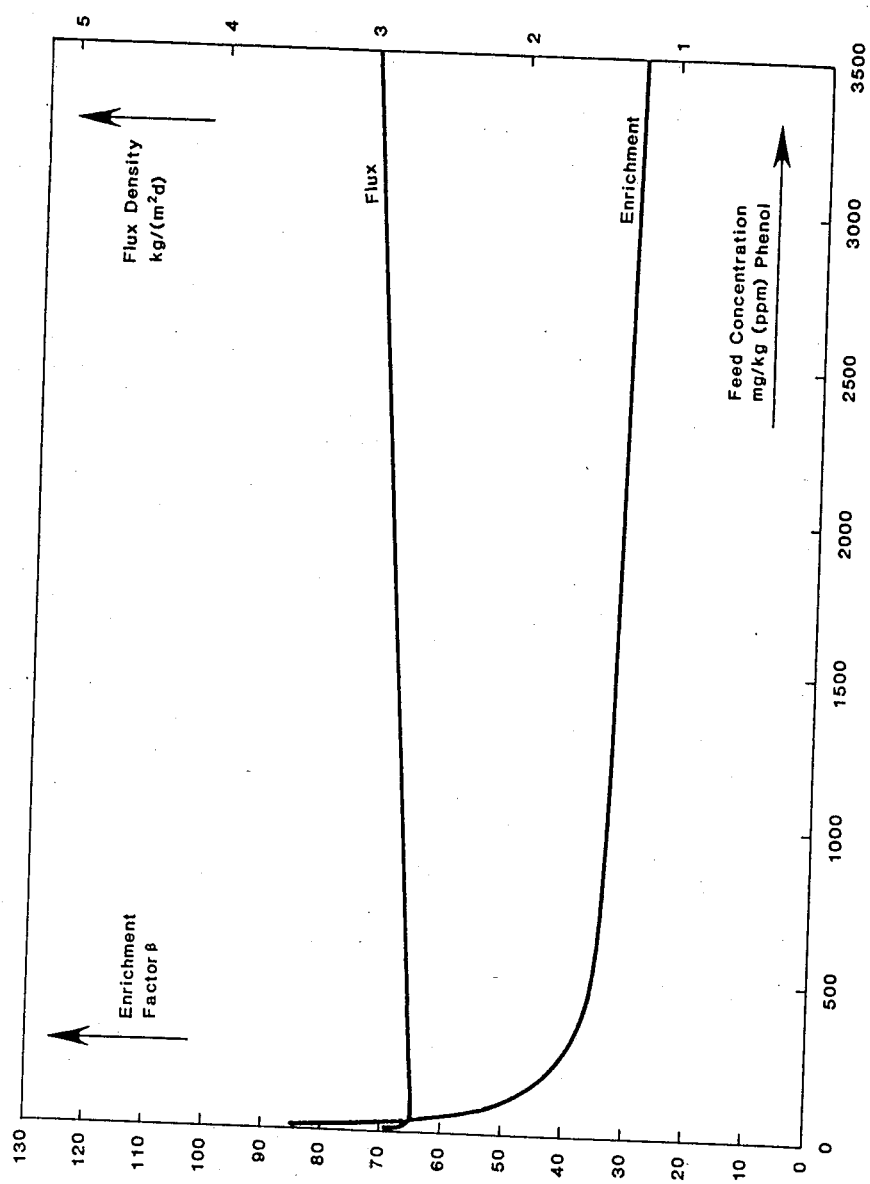

As seen in FIGS. 6 and 7, the two elastomeric membranes show a fairly similar pattern of enrichment and flux with progressing phenol depletion of the feed, i.e., there was a moderately increasing enrichment at high phenol concentration in the feed, followed by a marked increase in enrichment toward low residual phenol concentration, while flux density remained nearly independent of phenol concentration in the feed, slightly declining as phenol depletion progressed.

Figure 8:
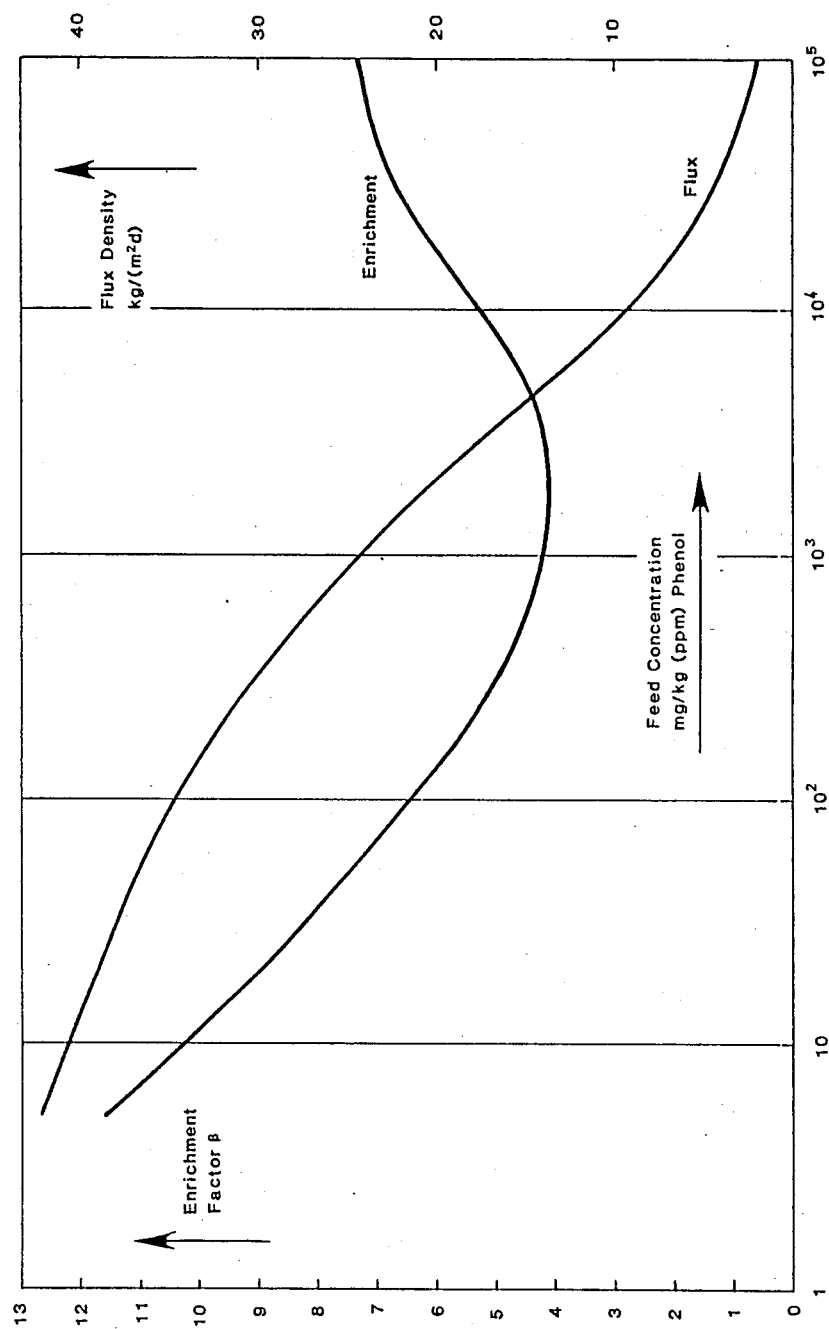

As seen in FIG. 8, the anion exchange membrane exhibited a generally lower enrichment and higher flux than the elastomeric membranes. Both enrichment and flux increased with decreasing feed concentration, enrichment passing through a minimum, while flux steadily increased.

EXAMPLE 4

Using the data of Example 3, single-stage pervaporation of aqueous phenolic feed solutions with initial concentrations of 5000 ppm, 1000 ppm and 200 ppm were evaluated assuming an elastomeric nonporous polymeric membrane (Pebax 5533) and the same apparatus as that of Example 1 for examination of the pattern of phenol depletion. The results are shown in Table 4, with all concentrations in ppm, (mg/kg), the membrane area in m$^2$/1000 kg·day, and showing the fraction of feed recovered as phenol-depleted retentate (% Feed in Retentate). As is apparent from Table 4, phenol depletion is readily accomplished in a single stage.

TABLE 4

| Feed Conc. | Retentate Conc. | Membrane Area | % Feed in Retentate |
|---|---|---|---|
| 5000 | 10 | 35 | 92 |
| 5000 | 1 | 42 | 90 |
| 5000 | 0.1 | 49 | 89 |
| 1000 | 10 | 24 | 95 |
| 1000 | 1 | 31 | 93 |
| 1000 | 0.1 | 36 | 92 |
| 200 | 10 | 14 | 97 |
| 200 | 1 | 21 | 96 |
| 200 | 0.1 | 26 | 95 |

EXAMPLE 5

Multi-stage pervaporation of feed solutions having the same concentrations as those of Example 4 was evaluated assuming an anion exchange membrane of the present invention (Raipore R-4035) in a series arrangement of the type depicted in FIG. 2. Each stage was designed to produce a retentate having the targeted residual phenol concentrations of 10 ppm and 1 ppm. The results are shown in Table 5, the units of which are the same as for Table 4 except that the membrane area given comprises the combined areas of the membranes for each stage of pervaporation necessary to achieve the phenol depletion shown.

TABLE 5

| Feed Conc. | Retentate Conc. | Membrane Area | % Feed in Retentate | Number of Stages Required |
|---|---|---|---|---|
| 5000 | 10 | 178 | 92 | 13 |
| 5000 | 1 | 197 | 85 | 12 |
| 1000 | 10 | 69 | 89 | 7 |
| 1000 | 1 | 94 | 89 | 9 |
| 200 | 10 | 23 | 93 | 4 |
| 200 | 1 | 36 | 92 | 5 |

EXAMPLE 6

Simultaneous enrichment of phenol to a permeate concentration of 10% (100,000 ppm), so as to cause phase separation as discussed above, and depletion of phenol from a water fraction was evaluated on feed solutions having the same concentrations as those of Example 4 by an arrangement of the type shown in FIG. 3 assuming an elastomeric nonporous polymeric membrane (Pebax 5533). Membrane areas for the two modules are given separately in table 6 in the same units as in Table 4. By recycling the phenol-enriched downstream permeate (permeate 2) to the feed stream, the phenol concentration of the feed is increased such that single-stage pervaporation yielded the targeted 10% phenolic concentration. Thus, as seen in Table 6, the fraction of the total membrane area required to deliver permeate for recycling increased as the initial feed concentration decreased.

TABLE 6

| Feed Conc. | Retentate Conc. | Permeate Conc. | Membrane Area | | % Feed in Retentate |
|---|---|---|---|---|---|
| | | | Module 1 | Module 2 | |
| 5000 | 10 | 100,000 | 18 | 20 | 95 |
| 5000 | 1 | 100,000 | 18 | 26 | 95 |
| 5000 | 0.1 | 100,000 | 18 | 27 | 95 |
| 1000 | 10 | 100,000 | 4 | 28 | 99 |
| 1000 | 1 | 100,000 | 4 | 37 | 99 |
| 1000 | 0.1 | 100,000 | 4 | 44 | 99 |
| 200 | 10 | 100,000 | 0.7 | 31 | 99 |
| 200 | 1 | 100,000 | 0.7 | 39 | 99 |
| 200 | 0.1 | 100,000 | 0.7 | 50 | 99 |

EXAMPLE 7

Using actual data obtained in the previous examples, an idealized process scheme of the type illustrated in FIG. 5 utilizing both elastomeric and anion exchange-type membranes of the present invention was evaluated. An elastomeric-type membrane with high selectivity is used in a first pervaporation stage on a dilute feed solution, while an anion exchange-type membrane with moderate selectivity is used in a second pervaporation stage to treat the "phenol in water" solution comprising the supernatant of the spontaneous phase separation occurring in the first phase separation step. Since this "phenol in water" solution is to be subjected to a second pervaporation stage as shown in FIG. 5, phenol enrichment of the first pervaporation stage may be limited to the concentration level of "phenol in water" (about 10% phenol), implying that very little "water in phenol" is being produced at this first pervaporation stage. Given appropriate process control, the first phase separation step may be eliminated altogether, feeding the condensed first stage permeate of "phenol in water" concentration directly into the second pervaporation stage. As would be expected given the low initial phenol concentrations considered, the fraction of the feed appearing as phenol-enriched permeate, to be processed in the second pervaporation stage, is small. Based on the separation characteristic of the anion exchange membrane Raipore R-4035, the following mass balance for the second stage pervaporation is obtained:

Pervaporation of 100 kg of "phenol in water" (10% phenol) at 50° C. yields:

16 kg of permeate (60% phenol);
84 kg of retentate (0.5% phenol).

The retentate is recycled into the original feed stream and thus remains in the process. The permeate undergoes phase separation as follows:

Phase separation of 16 kg of the above permeate (60% phenol) yields:

13.3 kg of "water in phenol" (70% phenol);

2.7 kg of "phenol in water" (10% phenol).

The "phenol in water" fraction is recycled to the second pervaporation step, as shown in FIG. 5. The "water in phenol" fraction, combined with the corresponding fraction of the first phase separation step, is considered to be the phenol-enriched product of the overall separation process.

The overall enrichment of phenol in the process envisioned depends solely on the initial phenol concentration of the feed stream, the exit concentration of the phenol-enriched process stream being fixed by the nature of the immiscible water-phenol phases. The overall enrichment realized by such a process is illustrated by the figures in Table 7, concentration again being given in ppm phenol.

TABLE 7

| Initial Feed Concentration | Overall Enrichment Factor |
|---|---|
| 200 | 3,500 |
| 1,000 | 700 |
| 2,000 | 350 |
| 5,000 | 140 |
| . | . |
| . | . |
| . | . |
| 100,000 (10%) | 7 |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A pervaporation method of selectively enriching the phenolic content of the permeate of an aqueous phenolic feed solution without pH adjustment, said phenolic content enrichment of said permeate increasing with decreasing phenolic concentration of said feed solution so as to permit increasing said phenolic content of said permeate to a phenolic concentration at which natural phase separation spontaneously occurs, said method comprising at least one pervaporation step of forming a vaporized phenol-enriched permeate comprising both phenols and water in a vapor state by (a) contacting the feed side of a nonporous polymeric membrane having a feed side and a permeate side with an aqueous phenol-containing feed stream, said membrane not being degraded by phenols and selected from the group consisting essentially of elastomeric polymers and anion exchange polymers, while (b) maintaining on the permeate side of said membrane either a pressure of 10 mmHg or less or an inert gas sweep stream, whereby phenols in said feed stream preferentially permeate said membrane to form a vaporized phenol-enriched permeate comprising both phenols and water in a vapor state on the permeate side of said membrane, and leaving a phenol-depleted water retentate on the feed side of said membrane.

2. The method of claim 1 wherein said vaporized phenol-rich permeate is condensed.

3. The method of claim 1 further including subjecting said phenol-depleted water retentate to at least one additional pervaporation step.

4. The method of claim 1 wherein said at least one pervaporation step is conducted until the concentration of phenol in said vaporized phenol-enriched permeate exceeds the phenol concentration of the phenol-poor fraction resulting from a naturally-occurring spontaneous phase separation of an aqueous phenolic solution into a phenol-rich fraction and a phenol-poor fraction.

5. The method of claim 1 or 4 combined with at least one phase separation step, said phase separation step comprising condensing said vaporized phenol-enriched permeate at a phenol concentration exceeding that at which, upon condensation, spontaneous phase separation of said condensed permeate occurs into a first phenol-poor fraction and a phenol-rich fraction.

6. The method of claim 5 followed by at least one additional pervaporation step applied to said first phenol-poor fraction of said phase separation step to form a second vaporized phenol-enriched permeate wherein the concentration of phenol exceeds a phenol concentration at which, upon condensation, spontaneous phase separation occurs.

7. The method of claim 6 combined with at least one phase separation step, said phase separation step comprising condensing said second vaporized phenol-enriched permeate, thereby causing spontaneous phase separation of said condensed second vaporized phenol-enriched permeate into a second phenol-poor fraction and a phenol-rich fraction.

8. The method of claim 5 including combining phase separated phenol-rich fractions.

9. The method of claim 7 combined with recycling said phase separated second phenol-poor fraction to said phase separated first phenol-poor fraction.

10. The method of claim 6 including recycling phenol-depleted water retentate to said aqueous phenol-containing feed stream.

11. The method of claim 5 including recovery of said phenol-rich fractions.

12. The method of claim 1, 3, 6, or 10 including recovery of said phenol-depleted water retentate.

13. The method of claim 7 including combining phase separated phenol-rich fractions.

14. The method of claim 6, 7 or 8 including recovery of said phenol-rich fractions.

* * * * *

UNITED STATES PATENT AND TRADEMARK OFFICE
CERTIFICATE OF CORRECTION

| | |
|---|---|
| PATENT NO. : | 4,806,245 |
| DATED : | Feb. 21, 1989 |
| INVENTOR(S) : | Karl W. Boddeker |

It is certified that error appears in the above-identified patent and that said Letters Patent is hereby corrected as shown below:

| | | |
|---|---|---|
| In the Abstract: | | Change "procresses" to --processes--. |
| Col 1., | Lines 7 and 8: | Move "This application is a continuation of application Ser. No. 918,533, filed Oct. 14, 1986, now abandoned." to be first paragraph under "PERVAPORATION OF PHENOLS"; |
| Col. 1, | Line 48: | Change "will" to --all--. |
| Col. 5, | Line 13: | Change "stream of" to --stream or--; |
| Col. 8, | Line 23: | Change "ppm," to --ppm--. |

Signed and Sealed this

Thirtieth Day of July, 1991

Attest:

HARRY F. MANBECK, JR.

*Attesting Officer*  *Commissioner of Patents and Trademarks*